H. SMITH.
BOILER FLUE SCRAPER.
APPLICATION FILED APR. 29, 1909.
945,732.
Patented Jan. 4, 1910.
2 SHEETS—SHEET 1.
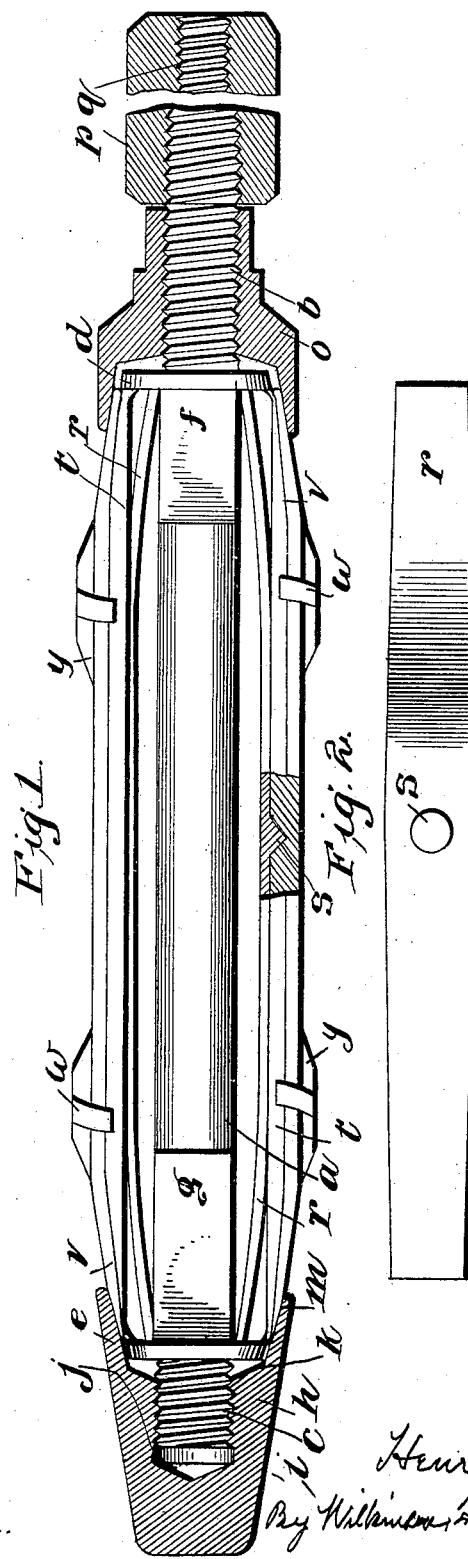
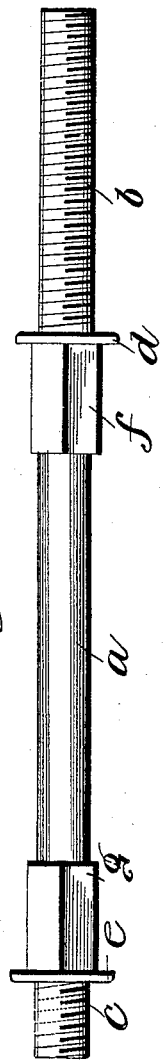
Witnesses
Jas C. Dodge
H. R. Edelen.
Inventor
Henry Smith
By Wilkinson, Fisher & Witherspoon
Attorneys

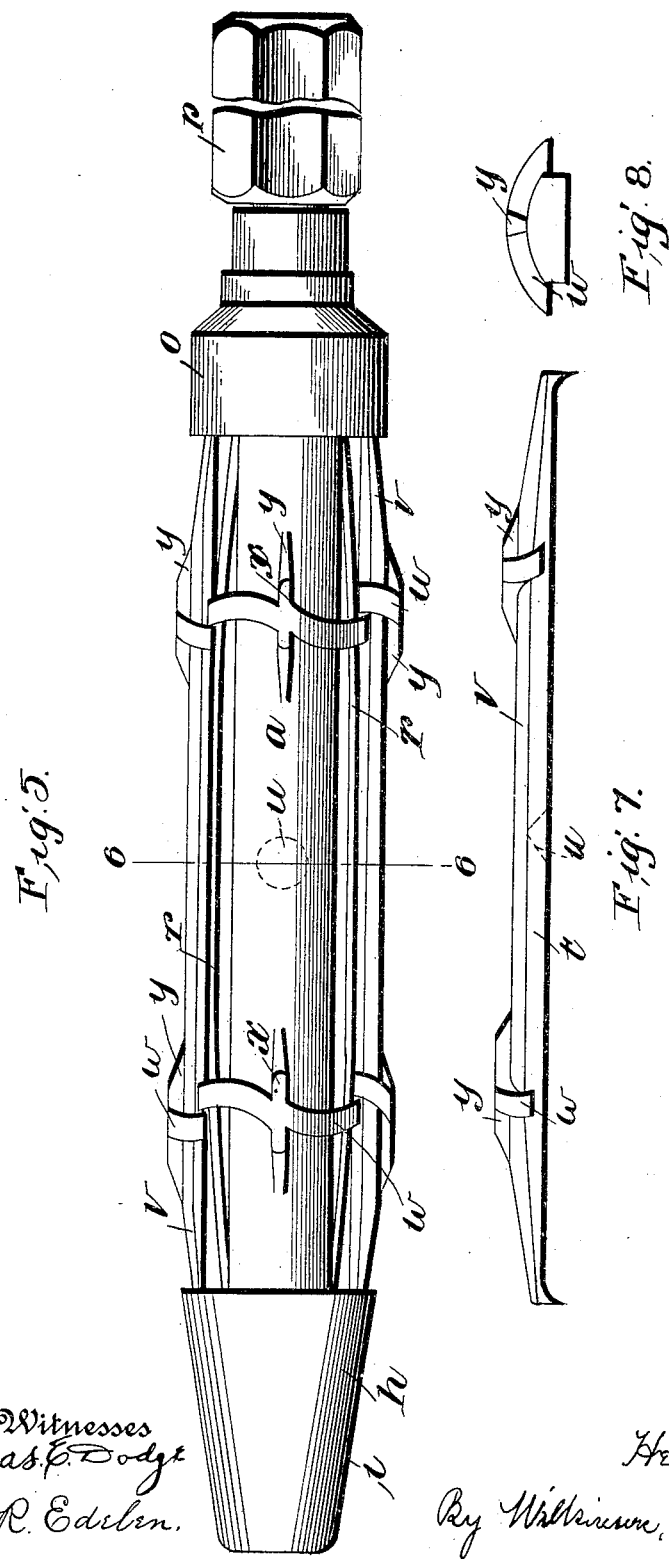

UNITED STATES PATENT OFFICE.

HENRY SMITH, OF THE UNITED STATES NAVY.

BOILER-FLUE SCRAPER.

945,732.   Specification of Letters Patent.   Patented Jan. 4, 1910.

Application filed April 29, 1909. Serial No. 493,025.

*To all whom it may concern:*

Be it known that I, HENRY SMITH, a citizen of the United States, residing at Brooklyn, in the county of Kings and State of New York, and a chief machinist in the U. S. Navy, have invented certain new and useful Improvements in Boiler-Flue Scrapers; and I do hereby declare the following to be a full, clear, and exact description of the invention, such as will enable others skilled in the art to which it appertains to make and use the same.

My invention relates to an improvement in scrapers.

The object of my invention is to provide an adjustable scraper which is especially adapted for cleaning boiler tubes of water tube boilers, and which will remove the small blisters inside of the tube, which hold pockets of magnetic iron oxid and carbonic acid gas.

With this object in view, my invention consists in the construction and combinations of parts as hereinafter described and claimed.

In the accompanying drawings—Figure 1 is a side elevation partly in section, of my improved scraper. Fig. 2 is a perspective view of one of the springs. Fig. 3 is a side view of the same. Fig. 4 is a perspective view on a smaller scale of the central securing rod. Fig. 5 is a perspective view of the complete device. Fig. 6 is a cross section on the line 6—6 of Fig. 5. Fig. 7 is a side view of one of the scraping devices, and Fig. 8 is an end view of the same.

This scraper is composed of a central metal rod, shown in Fig. 4, the interior of which, as shown at $a$, is cylindrical and provided with screw-threaded ends $b$ and $c$, collars $d$ and $e$, and squared portions $f$ and $g$. On the end $c$, which is adapted to be pushed into a boiler tube, a cap or nut $h$ is adapted to be screwed, which is tapered as shown at $i$ and is provided with a screw-threaded recess $j$, adapted to engage the end $c$ of the rod, and is cut away, forming a blunt, conical portion $k$, and cut away still farther to provide a larger conical portion $m$. $o$ represents a similar nut adapted to screw on to the threaded portion $b$ and provided with a central screw-threaded portion and two conical portions similar to those on the nut $h$. The screw-threaded portion $b$ is of such a length that when the nut $o$ is screwed home, or nearly so, the part $b$ will project considerably through this nut, and on this projecting portion a nut $p$ is adapted to be screwed and act as a jam nut against the part $o$, when the desired tension and diameter is obtained. The interior of the nut $p$ is provided with two screw-threaded portions, a larger portion adapted to engage with the screw-threaded portion $b$ and a smaller screw-threaded portion $q$, into which the end of a handle may be screwed.

$r$ represents a series of springs, four being preferably used, which are held between the collars $d$ and $e$, each of said springs being provided with a central boss $s$ on its outside. These springs are preferably made as shown in Figs. 2 and 3, although the exact form of said springs is not material.

$t$ represents one of the scraping plates, provided with a central recess $u$, adapted to engage the projection $s$ on the corresponding spring, and having its ends tapered off. Made integral with this plate $t$, or attached thereto in any suitable manner, are the scrapers, preferably made of steel, and consisting of a central portion $v$ and raised portions near each end thereof. These raised portions or cutters consist of a curved member $w$, having sharp edges and composed of drop-forgings of hardened steel, and a central portion $x$ tapering off as shown at $y$. The scraper blades are curved at each end to prevent disengagement between the collars and caps when the scraper is adjusted for tubes of a larger diameter. Cutters of mild steel as well as of hardened steel may be used to suit the condition of the deposit in the boiler tubes.

As shown in Fig. 5, the parts $w$ on the four scraping plates are so arranged as to overlap at their ends, so that no portion of the tube will escape the scraping action. It should be noted that the scrapers are square in cross section, so that they are self sharpening, that they are not perpendicular to the axis of the tool so that the ends of adjacent cutters overlap, the result being that no part of the tube is left unscraped when the tool is shoved or pulled through a boiler tube. The cutter nearest the stock is slightly larger than the one nearest the end, so that each set of cutters does independent work each time the scraper is pushed through.

The operation is as follows: A long rod with a hand grip at the end is screwed into the sleeve $p$. The tool is then pushed through the tube and pulled back, while a hose is played in the back header, the water washing out the deposit and keeping both front and rear cutting edges of the cutter clean. If, after the tool has made one passage through the tube, the latter is not perfectly clean, the operator adjusts the size of the tool by screwing out the nuts $h$ and $o$, and the scraping operation is repeated.

By the use of this tool in the manner described, the small blisters on the inside of the tube, which contain magnetic oxid of iron and carbonic acid gas, can be completely and efficiently removed, leaving the interior of the tube as clean as a new rifle barrel.

I claim:

A scraper comprising a central rod provided with screw-threaded ends, with collars located inside of said screw-threaded ends, and with flattened portions inside of said collars, a plurality of springs, one adapted to engage each of the flattened portions of said rod and rest against said collars, each of said springs being provided with a central boss on the outside, scraper plates, one engaging each of said springs, and having a recessed portion adapted to engage the boss on the corresponding spring, each of said scraper plates being provided with cutters, said cutters having curved ends, and nuts adapted to screw onto the screw-threaded portions of said rod, each nut being hollowed away and provided with two conical portions on its interior, against which said collars and the rounded ends of said scraper plates abut respectively, substantially as described.

In testimony whereof, I affix my signature, in presence of two witnesses.

HENRY SMITH.

Witnesses:
W. B. TARDY,
W. R. SCOFIELD.